ized Patent [19]  [11] B 3,920,522
Argoudelis et al.  [45] Nov. 18, 1975

[54] COMPOSITION OF MATTER AND PROCESS

[75] Inventors: Alexander D. Argoudelis, Portage; John H. Coats; Oldrich K. Sebek, both of Kalamazoo, all of Mich.

[73] Assignee: The UpJohn Company, Kalamazoo, Mich.

[22] Filed: Dec. 13, 1973

[21] Appl. No.: 424,462

[44] Published under the Trial Voluntary Protest Program on January 28, 1975 as document no. B 424,462.

Related U.S. Application Data

[62] Division of Ser. No. 215,119, Jan. 3, 1972, Pat. No. 3,817,979.

[52] U.S. Cl............................................... 195/80 R
[51] Int. Cl.$^2$........................................... C12D 9/00
[58] Field of Search ................................... 195/80 R

[56] References Cited
UNITED STATES PATENTS
2,928,844  3/1960  DeBoer et al......................... 195/80

*Primary Examiner*—Samih N. Zaharna
*Assistant Examiner*—Robert J. Warden
*Attorney, Agent, or Firm*—Roman Saliwanchik

[57]  ABSTRACT

A new antibiotic 7-0-demethylcelesticetin (IV) is produced by the controlled fermentation of the new microorganism *Streptomyces caelestis* strain 22227a in an aqueous nutrient medium. 7-0-Demethylcelesticetin is antibacterially active and also can be converted to various antibacterially active analogues.

3 Claims, No Drawings

COMPOSITION OF MATTER AND PROCESS

CROSS REFERENCE TO RELATED APPLICATION

This is a division of co-pending application Ser. No. 215,119, filed on Jan. 3, 1972 now U.S. Pat. No. 3,817,979.

BACKGROUND OF THE INVENTION

Celesticetin is an antibacterially active compound which is disclosed in U.S. Pat. No. 2,928,844. It can be represented by the following structural formula:

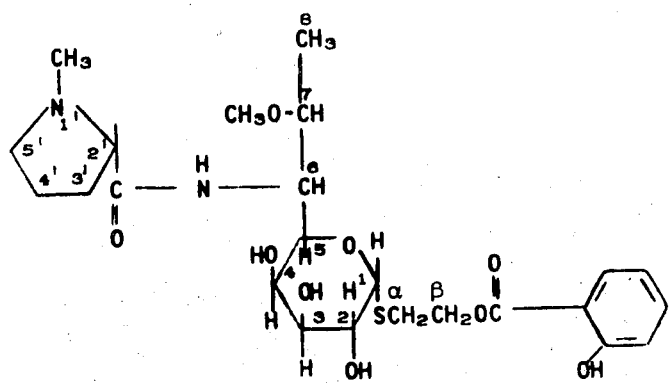

Celesticetin can be hydrolyzed according to the process disclosed in U.S. Pat. No. 2,851,463 to produce the compound desalicetin which can be represented by the following structural formula:

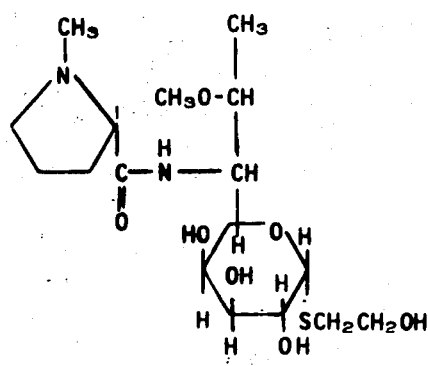

These celesticetin compounds are structurally related somewhat to the well-known antibiotic lincomycin which can be represented by the following structural formula:

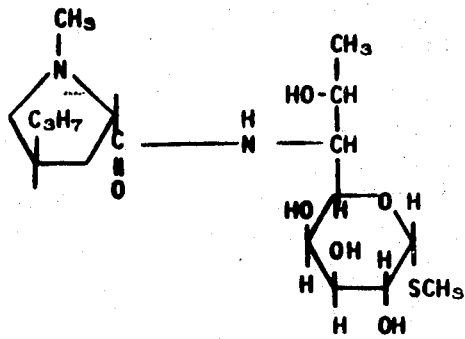

BRIEF SUMMARY OF THE INVENTION

The novel compound of the invention, 7-O-demethylcelesticetin, is obtained by culturing *Streptomyces caelestis* strain 22227a, NRRL 5320, in an aqueous nutrient medium. This compound can be represented by the following structural formula:

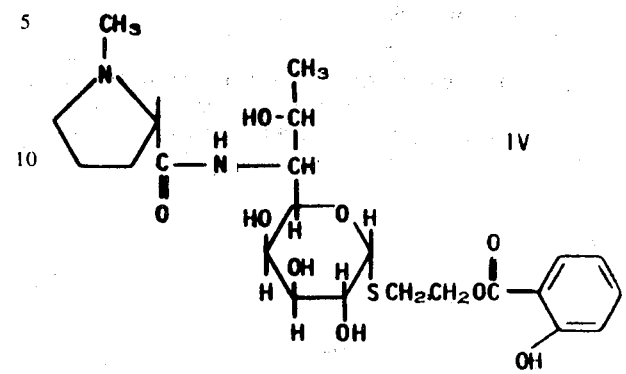

Upon the treatment of 7-O-demethylcelesticetin with a suitable base, for example, sodium hydroxide, potassium hydroxide, ammonium hydroxide, and the like, there is produced 7-O-demethyldesalicetin which can be represented by the following structural formula:

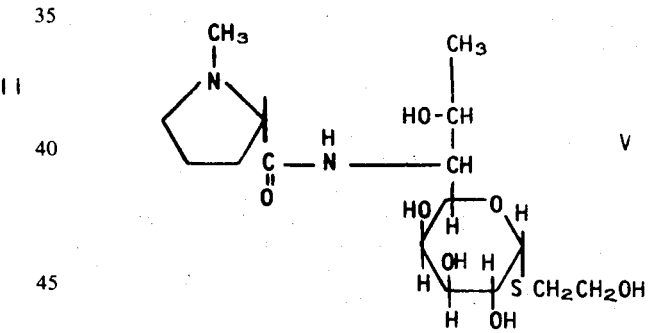

Treatment of 7-O-demethylcelesticetin with hydrazine hydrate yields β-hydroxyethylthiolincosaminide (β-HETL) which can be represented by the following structural formula:

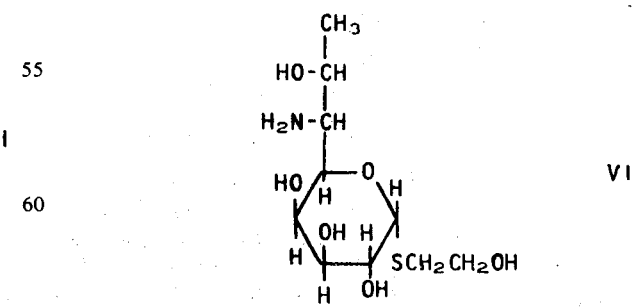

In addition to β-hydroxyethylthiolincosaminide, there is produced hygric acid hydrazide which can be transformed to hygric acid hydrochloride by heating with aqueous hydrochloric acid. The sequence of this latter reaction can be shown as follows:

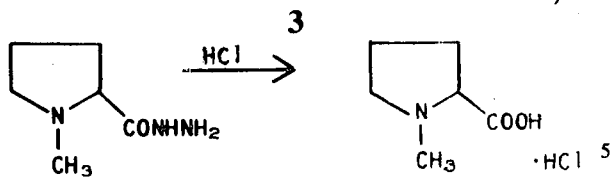

7-0-Demethylcelesticetin (IV) can be converted to various antibacterially active analogues. Compound (IV) and these analogues can be represented by the following structural formula:

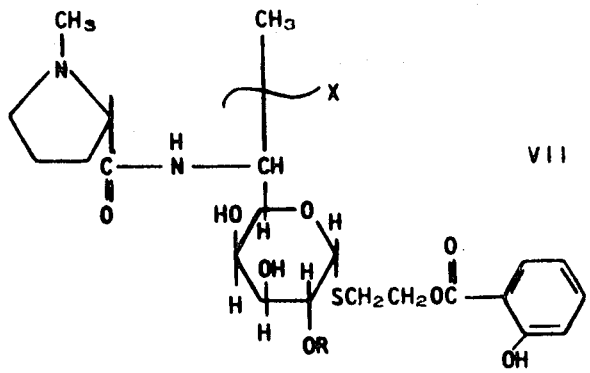

wherein X is —OH in the (R) and (S) configuration; halo in the (R) and (S) configuration; alkoxy of not more than 20 carbon atoms in the (R) and (S) configuration excepting where X is (R)—OCH$_3$ and R is hydrogen; and R is hydrogen or is selected from the group consisting of hydrocarbon carboxylic acid acyl of not more than 18 carbon atoms, or a halo-, nitro-, hydroxy-, amino-, thiocyano-, and lower alkoxy- hydrocarbon carboxylic acid acyl of not more than 18 carbon atoms, inclusive, and

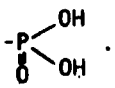

7-0-Demethyldesalicetin (V) can be converted to various antibacterially active analogues. Compound (V) and these analogues can be represented by the following structural formula:

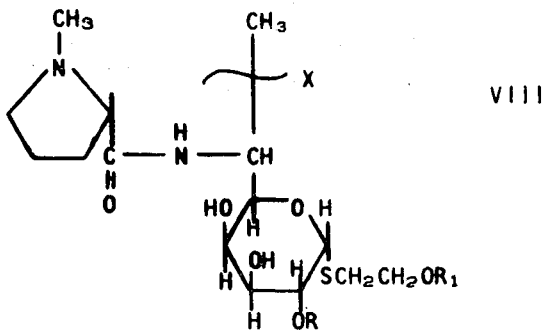

wherein X and R are as defined above; and R$_1$ is hydrogen and is selected from the group consisting of hydrocarbon carboxylic acid acyl of not more than 18 carbon atoms, or a halo-, nitro-, hydroxy-, amino-, thiocyano-, and loweralkoxy- hydrocarbon carboxylic acid acyl of not more than 18 carbon atoms, inclusive, except that R$_1$ is not the salicylic acid moiety when X is (R)—OCH$_3$ and R is hydrogen.

β-Hydroxyethylthiolincosaminide (VI) can be converted to various analogues which can be represented by the following structural formula:

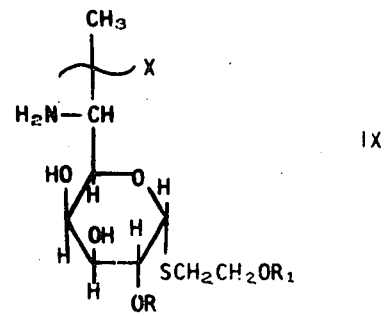

wherein X, R and R$_1$ are as defined above.

Compounds of formula IX can be converted to antibacterially-active compounds by coupling with a pyrrolidinecarboxylic acid as disclosed in U.S. Pat. No. 3,514,440. The compounds formed as well as the process are disclosed in said patent.

Examples of alkoxy of not more than 20 carbon atoms are methoxy, ethoxy, propoxy, butoxy, pentyloxy, hexyloxy, heptyloxy, octyloxy, nonyloxy, decyloxy, undecyloxy, dodecyloxy, tridecyloxy, tetradecyloxy, pentadecyloxy, hexadecyloxy, heptadecyloxy, octadecyloxy, nonadecyloxy, and eicosyloxy and the isomeric forms thereof. Examples of halo are chlorine, bromine and iodine. Examples of alkylthio of not more than 20 carbon atoms are methylthio, ethylthio, propylthio, butylthio, pentylthio, hexylthio, heptylthio, octylthio, nonylthio, decylthio, undecylthio, dodecylthio, tridecylthio, tetradecylthio, pentadecylthio, hexadecylthio, heptadecylthio, octadecylthio, nonadecylthio, and eicosylthio and the isomeric forms thereof. Examples of hydrocarbon carboxylic acid acyl of not more than 18 carbon atoms, or a halo-, nitro-, hydroxy-, amino-, thio-, cyano-, and loweralkoxy- hydrocarbon carboxylic acid acyl of not more than 18 carbon atoms, inclusive, are as disclosed in U.S. Pat. No. 3,426,012, column 5, line 64 to column 6, line 47.

DETAILED DESCRIPTION

CHEMICAL AND PHYSICAL PROPERTIES OF 7-0-DEMETHYLCELESTICETIN HYDROCHLORIDE

Elemental Analysis:
 Calc'd. for $C_{23}H_{34}N_2O_9S \cdot HCl$:
 C, 50.22; H, 6.41; N, 5.09; S, 5.83; Cl, 6.45.
 Calc'd. for $C_{23}H_{34}N_2O_9S \cdot HCl \cdot H_2O$:
 C, 48.63; H, 6.57; N, 4.93; S, 5.68; Cl, 6.24.
 Found:
 C, 46.57; H, 6.21; N, 5.72; S, 5.13; Cl, 7.35.

Molecular Weight: The calculated molecular weight for the hydrochloride is 550; 7-0-demethylcelesticetin hydrochloride monohydrate has a molecular weight of 568. Potentiometric titration showed a molecular weight of 534.

Titratable Groups: Potentiometric titration in water using aqueous KOH showed the presence of a basic group pKa', 7.5 and show a weakly acidic group, pKa', 9.6.

Specific Rotation: $[\alpha]_D^{25} = +115°$ (C. 0.85 in water)

Ultraviolet Absorption Spectra:

| | |
|---|---|
| In absolute methanol: | λ max. at 238 mµ (a = 18) |
| | λ max. at 304 mµ (a = 7.3) |
| In alkaline methanol: | λ max. at 242 mµ (a = 13.4) |
| | λ max. at 335 mµ (a = 8.7) |

Infrared Absorption Spectra: Following is a tabulation of the infrared absorption spectrum wave lengths in mineral oil mull expressed in reciprocal centimeters:

| Band Frequency (cm⁻¹) | Band Frequency (cm⁻¹) | Band Frequency (cm⁻¹) |
|---|---|---|
| 3340 (S) | 1379 sh (S) | 1030 sh (M) |
| 3070 (M) | 1374 (S) | 1010 (M) |
| 2940 (oil) (S) | 1363 (S) | 985 (M) |
| 2860 (oil) (S) | 1321 (S) | 970 sh (M) |
| 1715 sh (M) | 1298 (S) | 950 sh (M) |
| 1680 sh (S) | 1246 (S) | 900 (W) |
| 1670 (S) | 1233 sh (S) | 865 (M) |
| 1650 sh (S) | 1214 (S) | 850 sh (W) |
| 1609 (M) | 1200 sh (S) | 810 (M) |
| 1578 (M) | 1155 (S) | 799 (M) |
| 1565 (M) | 1133 (S) | 757 (M) |
| 1535 sh (M) | 1085 (S) | 720 (M) |
| 1482 (S) | 1047 (S) | 700 (M) |
| 1455 (S) | | |

Following is a tabulation of the infrared absorption spectrum wave lengths where the compound is pressed into a KBr pellet expressed in reciprocal centimeters:

| Band Frequency (cm⁻¹) | Band Frequency (cm⁻¹) | Band Frequency (cm⁻¹) |
|---|---|---|
| 3360 (S) | 1560 (M) | 1048 (S) |
| 3070 (M) | 1483 (S) | 1010 (M) |
| 2975 (M) | 1455 (M) | 986 (M) |
| 2940 (M) | 1385 (S) | 970 (M) |
| 2900 sh (M) | 1323 (S) | 900 (W) |
| 2840 sh (M) | 1298 (S) | 865 (M) |
| 2700 sh (M) | 1248 (S) | 850 sh (W) |
| 1717 sh (M) | 1212 (S) | 813 sh (W) |
| 1673 (S) | 1156 (S) | 800 (M) |
| 1610 (M) | 1135 (S) | 759 (M) |
| 1580 (M) | 1085 (S) | 702 (M) |

Infrared band intensities, throughout this disclosure, are indicated as S, M, and W, respectively, and are approximated in terms of the backgrounds in the vicinity of the bands. An S band is of the same order of intensity as the strongest in the spectrum; M bands are between one-third and two-thirds as intense as the strongest band; and, W bands are less than one-third as intense as the strongest band. These estimates are made on the basis of a percent transmission scale.

| ANTIBACTERIAL ACTIVITY OF 7-O-DEMETHYLCELESTICETIN | |
|---|---|
| TEST MICROORGANISM | Minimum Inhibitory Concentration in mcg./ml. |
| *Staphylococcus aureus* | 2.0 |
| *Streptococcus hemolyticus* | 1.0 – ±0.5 |
| *Streptococcus faecalis* | 4.0 |
| *Escherichia coli* | >500 |
| *Proteus vulgaris* | >500 |
| *Klebsiella pneumoniae* | 62.5 |
| *Pseudomonas aeruginosa* | >500 |
| *Diplococcus pneumoniae* | 1.0 |

The above antibacterial spectrum was obtained by a tube dilution assay procedure. This procedure was conducted with the medium BHI (Brain Heart Infusion Broth, Difco, Detroit, Mich.). Assay tubes (13 mm. × 100 mm.) were prepared in the customary manner as set out in Snell, E. E., Vitamin Methods, Vol. 1, Academic Press, Inc., New York (1950), page 327. Test organisms grown for 18 hours at 37°C. were added to inoculate the test medium. The assays were read at 17 hours.

THE MICROORGANISM

The microorganism used for the production of 7-O-demethylcelesticetin is a mutant of *Streptomyces caelestis*, NRRL 2418, which has been named *Streptomyces caelestis* strain 22227a. This mutant is distinguishable from *Streptomyces caelestis* taxonomically, as shown hereinafter, and by its ability to produce 7-O-demethylcelesticetin. A subculture of the living organism can be obtained from the permanent collection of the Northern Utilization and Research Division, Agricultural Research Service, U.S. Department of Agriculture, Peoria, Ill., U.S.A. Its accession number in this repository is NRRL 5320.

The microorganism of this invention was studied and characterized by Alma Dietz of The Upjohn Research Laboratory.

DESCRIPTION OF THE MICROORGANISM

*Streptomyces caelestis* strain 22227a.

Culture Description: *Streptomyces caelestis* strain 22227a was compared with the parent culture (which is also the type culture) *Streptomyces caelestis* DeBoer et al. [DeBoer, C., A. Dietz, J. R. Wilkins, C. N. Lewis and G. M. Savage, 1954–1955. Celesticetin — A New, Crystalline Antibiotic. I. Biologic Studies of Celesticetin. Antibiotics Annual. New York. Medical Encyclopedia, Inc., 1955, pp. 831–836], NRRL 2418.

Both cultures have celestial blue aerial growth, are melanin-positive and have open spiral to spiral sporophores bearing rectangular smooth spores with a ridged surface detail.

In the synthetic medium cited in Shirling and Gottlieb [Shirling, E. B. and D. Gottlieb. 1966. Methods for Characterization of *Streptomyces* Species, Int. J. System. Bacteriol. 16:313–340] the cultures grew slightly on the negative control (no carbon compound added) and well on the D-glucose control. Carbon utilization was strong on the synthetic medium with sucrose, D-xylose, inositol, D-fructose, rhamnose and raffinose; positive with D-arabinose; doubtful with cellulose; and negative with D-mannitol.

Both cultures solubilized tyrosine and hydrolyzed starch. Casein and xanthine were not solubilized. Malate was solubilized around the culture growth.

Strain 22227a differed from the parent culture in the characteristics cited in Table I which follows.

Streptomyces caelestis strain 22227a, a mutant of *Streptomyces caelestis* NRRL 2418, is readily distinguished from the parent culture by its ability to produce 7-O-demethylcelesticetin and by minor points given in Table I. It is not readily distinguished from the parent culture in its major cultural characteristics of color, sporophore, and spore type.

Strain 22227a is used in the sense of Recommendation 8a(1) of the International Code of Nomenclature of Bacteria [International Code of Nomenclature of Bacteria. 1966, edited by the Editorial Board of the Judicial Commission of the International Committee on Nomenclature of Bacteria. Intern. J. System. Bacteriol. 16:459–490], in which a number which is a laboratory distinguishing mark may be used to designate the descendants of a single isolation in pure culture.

The characteristics of *Streptomyces caelestis* strain 22227a, NRRL 2418, are given in the following table.

TABLE I

Culture Differences of
S. caelestis Strain 22227a and S. caelestis

| Culture Medium | S. caelestis strain 22227a | S. caelestis (parent) NRRL 2418 |
|---|---|---|
| Litmus milk | pH 6.3 | pH 4.9 |
| Nitrate Broth | | |
| Synthetic | Nitrate not reduced to nitrite | Nitrate reduced to nitrite |
| Nutrient | Nitrate not reduced to nitrite | Nitrate reduced to nitrite |
| Antibiotic Produced | 7-O-Demethyl-celesticetin | Celesticetin |

The new compound of the invention is produced when the elaborating organism is grown in an aqueous nutrient medium under submerged aerobic conditions. It is to be understood also that for the preparation of limited amounts surface cultures and bottles can be emloyed. The organism is grown in a nutrient medium containing a carbon source, for example, an assimilable carbohydrate, and a nitrogen source, for example, an assimilable nitrogen compound or proteinaceous material. Preferred carbon sources include glucose, brown sugar, sucrose, glycerol, starch, cornstarch, lactose, dextrin, molasses, and the like. Preferred nitrogen sources include corn steep liquor, yeast, autolyzed brewer's yeast with milk solids, soybean meal, cottonseed meal, cornmeal, milk solids, pancreatic digest of casein, distillers' solids, animal peptone liquors, meat and bone scraps, and the like. Combinations of these carbon and nitrogen sources can be used advantageously. Trace metals, for example, zinc, magnesium, manganese, cobalt, iron, and the like, need not be added to the fermentation media since tap water and unpurified ingredients are used as media components.

Production of the compound of the invention can be effected at any temperature conducive to satisfactory growth of the microorganism, for example, between about 18° and 40°C., and preferably between about 20° and 32°C. Ordinarily, optimum production of the compound is obtained in about 2 to 10 days. The medium normally remains basic during the fermentation. The final pH is dependent, in part, on the buffers present, if any, and in part on the initial pH of the culture medium.

When growth is carried out in large vessels and tanks, it is preferable to use the vegetative form, rather than the spore form, of the microorganism for inoculation to avoid a pronounced lag in the production of the new compound and the attendant inefficient utilization of the equipment. Accordingly, it is desirable to produce a vegetative inoculum in a nutrient broth culture by inoculating this broth culture with an aliquot from a soil or a slant culture. When a young, active vegetative inoculum has thus been secured, it is transferred aseptically to large vessels or tanks. The medium in which the vegetative inoculum is produced can be the same as, or different from, that utilized for the production of the new compound, as long as it is such that a good growth of the microorganism is obtained.

The new compound of the invention, 7-0-demethyl-celesticetin (IV), exists either in the non-protonated (free base) form or the protonated (salt) form depending on the pH of the environment. It forms stable protonates (acid addition salts) by neutralization of the free base with an acid or by metathesis between the protonated form of 7-0-demethylcelesticetin and the anion of an acid. Suitable acids for this purpose include hydrochloric, sulfuric, phosphoric, acetic, succinic, citric, lactic, maleic, fumaric, pamoic, cholic, palmitic, mucic, camphoric, glutaric, glycolic, phthalic, tartaric, lauric, stearic, salicylic, 3-phenylsalicylic, 5-phenylsalicylic, 3-methylglutaric, orthosulfobenzoic, cyclohexanesulfamic, cyclopentanepropionic, 1,2-cyclohexanedicarboxylic, 4-cyclohexenecarboxylic, octadecenylsuccinic, octenylsuccinic, methanesulfonic, benzenesulfonic, helianthic, Reinecke's, azobenzenesulfonic, octadecylsulfuric, picric, and the like acids. These acid addition salts are useful in upgrading the free base.

Because of the presence of the salicylic acid moiety, compound IV forms salts with alkali metals and alkaline earth metals by procedures well known in the art. Salts which can be made are the sodium, potassium, calcium, lithium, and the like. These salts have the uses disclosed above for the acid addition salts.

7-0-Demethylcelesticetin (IV) is soluble in lower alcohols of from 1 to 4 carbon atoms, inclusive, and ketones; it is less soluble in water and chlorinated hydrocarbon solvents; and essentially insoluble in ether and saturated hydrocarbon solvents.

A variety of procedures can be employed in the isolation and purification of 7-0-demethylcelesticetin (IV) for example, solvent extraction, partition chromatography, silica gel chromatography, liquid-liquid distribution in a Craig apparatus, and crystallization from solvents.

In a preferred recovery process, 7-0-demethylcelesticetin (IV) is recovered from its culture medium by separation of the mycelia and undissolved solids by conventional means, such as by filtration or centrifugation. The antibiotic is then removed from the filtered or centrifuged broth by resin sorption on a resin comprising a non-ionic macro porous copolymer of styrene crosslinked with divinylbenzene. Suitable resins are Amberlite XAD-1 and XAD-2 disclosed in U.S. Pat. No. 3,515,717. The resin is eluted with an organic or aqueous organic solvent in which the sorbed antibiotic is soluble. Ninety-five percent aqueous methanol is the preferred solvent for elution. The antibiotic in the methanol eluates is recovered by concentrating the eluates to dryness and then subjecting them to silica gel G (E. Merck AG., Darmstadt, ART. 7734) chromatography using a suitable solvent system, for example, chloroform and methanol in the ratio 6:1 (v/v). Fractions obtained from the silica gel G chromatography are combined and concentrated to dryness. The resulting residue is dissolved in a suitable solvent mixture, for example, ether-methanol (50:1), and the solution is mixed with methanolic hydrogen chloride to give a precipitate of 7-0-demethylcelesticetin hydrochloride.

Alkaline hydrolysis of 7-0-demethylcelesticetin (IV) with a suitable base, for example, sodium hydroxide, for 16 hours at room temperature results in the cleavage of the ester group and the formation of 7-0-demethyldesalicetin (V). Other bases, for example, aqueous ammonium hydroxide and organic amines can be used instead of sodium hydroxide. The reaction can be carried out in solvents like lower alcohols (methanol, ethanol) by refluxing in the presence of base. Duration of the treatment depends on the strength of the base and the temperature used.

Salicyclic acid, which is formed as a by-product during the above reaction, can be removed by extraction with ether at pH 3.0.

Hydrazinolysis of 7-0-demethylcelesticetin (IV) with hydrazine hydrate at reflux for about 23 hours affords hygric acid hydrazide which can be transformed to hygric acid hydrochloride by heating with aqueous hydrochloric acid. The second product of the above hydrazinolysis reaction is β-hydroxyethylthiolincosaminide (β-HETL) (VI).

7-0-Demethyldesalicetin and β-HETL exist either in the non-protonated (free base) form or the protonated (salt) form depending on the pH of the environment. Acid addition salts of these compounds can be made as disclosed above for 7-0-demethylcelesticetin.

7-0-Demethylcelesticetin (IV) and its salts are active against *Staphylococcus aureus* and *Streptococcus faecalis* and can be used to disinfect washed and stacked food utensils contaminated with these bacteria; they can also be used as disinfectants on various dental and medical equipment contaminated with *Staphylococcus aureus*. Further, since 7-0-demethylcelesticetin is active against *Streptococcus hemolyticus* it can be used to disinfect instruments, utensils or surfaces where the inactivation of this organism is desirable.

7-0-Demethyldesalicetin (V) and its salts are active against Staphylococcus aureus and can be used for the same purposes given for the 7-0-demethylcelesticetin. β-Hydroxyethylthiolincosaminide (β-HETL) (VI) can be used for the resolution of racemic acids, for example, β-HETL can be reacted with racemic acids to form diastereoisomeric acid addition salts which can be separated by fractional crystallization into diastereoisomeric from which the optically active acids can be generated. β-HETL also is useful as an intermediate. It reacts with isocyanates to form urethanes and ureas, and can be used to modify polyurethane resins. For example, it can be reacted with an excess of toluene diisocyanate to form a prepolymer which can then be reacted with the polyol and polyol esters commonly used to form polyurethanes; or β-HETL can be mixed with the polyol compound and the mixture then reacted with toluene diisocyanate. β-HETL can also be reacted with ethylene oxide, propylene oxide, and like alkylene oxides to form polyoxyalkylene β-HETL which can be reacted with toluene diisocyanate to form a polyurethane. β-HETL is particularly useful for producing rigid polyurethane foams. It also condenses with formaldehyde, especially when the thiocyanic acid addition salt is employed, to form polymers according to U.S. Pat. Nos. 2,425,320 and 2,606,155 which are useful as pickling inhibitors. Its fluosilicic acid addition salt is also useful as a mothproofing agent in accordance with U.S. Pat. Nos. 1,915,334 and 2,075,359. β-HETL also can be coupled with a pyrrolidinecarboxylic acid to yield antibacterially active compounds as disclosed in U.S. Pat. No. 3,514,440.

7-0-Demethylcelesticetin (IV) can be converted to various antibacterially active analogues as represented by structural formula VII. For example, 7-epi-7-0-demethylcelesticetin can be prepared by the procedure disclosed in U.S. Pat. No. 3,514,440, column 2, line 44 to column 3, line 10; 7(R)- and 7(S)-halo-7-demethoxycelesticetin can be prepared by the methods disclosed in U.S. Pat. No. 3,496,163, using the "modified Rydon procedure" as given in Example 6 of said patent; 7(R)-0-alkyl-7-0-demethylcelesticetin can be prepared by esterification of 7(R)-0-alkyl-7-0-demethyldesalicetin at the primary hydroxyl with salicyloyl chloride as disclosed in U.S. Pat. No. 2,851,463, especially column 2, lines 70 et seq.; 7(S)-0-alkyl-7-0-demethylcelesticetin can be prepared from 7(S)-0-alkyl-7-0-demethyldesalicetin by the procedure disclosed above for the preparation of the 7(R) isomer; 2-0-phosphates can be prepared by the procedures disclosed in U.S. Pat. No. 3,487,068; and 2-0-acylates can be prepared by the acylation procedures disclosed in U.S. Pat. No. 3,326,891 and U.S. Pat. No. 3,426,012. Salts of the compounds of structural formula VII can be made as disclosed for compound IV. These salts are useful in the same manner as the non-protonated compounds, and further, they can be used to upgrade the non-protonated compounds by procedures well known in the art.

7-0-Demethyldesalicetin (V) can be converted to various antibacterially active analogues as represented by structural formula (VIII). For example, 7-epi-7-0-demethyldesalicetin can be prepared by hydrolysis of the β-0-salicylyl acyl of 7-epi-7-0-demethylcelesticetin by methods disclosed in U.S. Pat. No. 2,851,463, especially column 1, line 27 to column 2, line 56 [7-epi-7-0-demethylcelesticetin can be prepared by methods disclosed in U.S. Pat. No. 3,514,440, as noted above]; β-acylates of 7-epi-7-0-demethyldesalicetin can be prepared by the procedures disclosed in U.S. Pat. No. 2,851,463, particularly those disclosed in column 2, line 56 to column 3, line 16; 7(R)- and 7(S)-halo-7-demethoxydesalicetin can be prepared by hydrolysis of 7(R)- and 7(S)-halo-7-demethoxycelesticetin by methods disclosed in U.S. Pat. No. 2,851,463, especially column 1, line 27 to column 2, line 56, except that the process should be carried out at room temperature, at a pH of 8 – 10, preferably about pH 10, so as to selectively remove the salicylyl and not hydrolyze off the 7-halo group [7(R)- and 7(S)-halo-7-demethoxycelesticetin can be prepared by methods disclosed in U.S. Pat. No. 3,496,163, as noted above]; 7(R)-0-alkyl-7-0-demethyldesalicetin can be prepared by reacting 7(R)-0-alkyl-HETL [this compound can be prepared by substituting HETL (VI) for the compound methyl thiolincosaminide (MTL) in the procedures disclosed in U.S. Pat. No. 3,574,187] with ethyl chloroformate according to methods known in the art to give the 7(R)-0-alkyl-HETL β-0-ethylcarbonate ester which then can be N-acylated with hygric acid by the procedures disclosed in U.S. Pat. No. 3,380,992, especially Example 6—the ethylcarbonate ester protective group can be removed by treatment with a mild base, e.g. NaHCO₃; 7(S)-0-alkyl-7-0-demethyldesalicetin can be prepared from 7(S)-0-alkyl-7-0-demethyl-HETL according to the procedure given above for the 7(R) isomer; 2-0-phosphates can be prepared by first preparing the β-0-(alkyl carbonate)ester of desalicetin (II) by reaction of the desalicetin compound with an alkyl chloroformate using procedures known in the art, and then phosphorylating the reaction product according to the procedures disclosed in U.S. Pat. No. 3,487,068—the alkyl carbonate protective group can be removed by treatment of the phosphorylated product with mild base, e.g. NaHCO₃; β-0-acylates can be prepared by the procedures disclosed in U.S. Pat. No. 2,851,463, especially column 2, lines 70 et seq. using one mole of acylating agent per mole of desalicetin compound; and 2-0-acylates can be prepared by the acylation procedures disclosed in U.S. Pat. No. 3,326,891 and U.S. Pat. No. 3,426,012. Acid addition salts of the compounds of structural formula VIII can be made as disclosed for compound IV. These salts are useful in the same manner as the non-protonated compounds, and, further, they can be used to upgrade the nonprotonated compounds by procedures well known in the art.

β-HETL (VI) can be converted to various analogues as represented by structural formula IX. For example, 7-epi-HETL can be prepared by hydrazinolysis of 7-epi-7-0-demethylcelesticetin or 7-epi-7-0-demethyldesalicetin by the procedures disclosed in U.S. Pat. No. 2,928,944 and U.S. Pat. No. 2,851,463; 7(S)-halo-7-deoxy-HETL can be prepared by reacting HETL (VI) with carbobenzoxychloride according to methods known in the art to give N-carbobenzoxy-HETL which then can be reacted with one mole of acetic anhydride by procedures known in the art to give the β-monoacetate compound. This compound is then hydrogenolyzed, for example, according to the procedures disclosed in U.S. Pat. No. 3,380,992, column 18, part E-1, and the resulting product can be reacted with a modified Rydon reagent according to the process disclosed in U.S. Pat. No. 3,496,163 to yield the 7(S)-halo analogue. This compound can be treated with alkali according to the process disclosed in U.S. Pat. No. 2,851,463 to yield 7(S)-halo-7-deoxy-HETL [the 7(R)-halo analogue is prepared by the same route except that 7-epi-HETL, prepared as described above, is the starting material]; 7(R)-0-alkyl HETL is prepared by substituting HETL (VI) for MTL in the procedures disclosed in U.S. Pat. No. 3,574,187; 7(S)-0-alkyl-HETL can be prepared by first converting 7(S)-halo-7-0-demethyl-HETL β-0-acetate, prepared as described above, to the 6,7-aziridino derivative by the procedures disclosed in U.S. Pat. No. 3,544,551, especially column 8, line 36 et seq., and Example 1, part A-1. The aziridino derivative is then converted to 7(S)-0-alkyl-HETL by the procedures disclosed in U.S. application Ser. No. 26,119, filed in the U.S. Patent Office on Apr. 6, 1970; and β-0-acylates can be prepared by the procedures disclosed in U.S. Pat. No. 2,851,463, especially column 2, lines 70 et seq. using one mole of acylating agent per mole of HETL (VI). Acid addition salts of the compounds of structural formula IX can be made as disclosed for compound IV. These salts are useful in the same manner as the nonprotonated compounds, and, further, they can be used to upgrade the nonprotonated compounds by procedures well known in the art.

The following examples are illustrative of the process and products of the present invention, but are not to be construed as limiting. All percentages are by weight and all solvent mixture proportions are by volume unless otherwise noted.

EXAMPLE 1

7-0-Demethylcelesticetin (IV)

Part A: Fermentation

Mycelium and/or spores from a slant of *Streptomyces caelestis* strain 22227a, NRRL 5320, is used to inoculate a series of 500-ml. Erlenmeyer flasks each containing 100 ml. of seed medium consisting of the following ingredients:

| | | |
|---|---|---|
| Glucose monohydrate | 25 | gm./l. |
| Pharmamedia* | 25 | gm./l. |
| Tap water q.s. | 1 | l. |

*Pharmamedia is an industrial grade of cottonseed flour produced by Trader's Oil Company, Ft. Worth, Texas.

The seed medium presterilization pH is 7.2. The seed is grown for three days at 28°C. on a Gump rotary shaker operating at 250 rpm.

A 5% inoculum of the seed described above, 5 ml., is added to each 500-ml. Erlenmeyer flask containing 100 ml. of the following fermentation medium:

| | | |
|---|---|---|
| Corn Starch U.S.P. | 30 | gm./l. |
| Glucose monohydrate | 10 | gm./l. |
| Corn steep liquor | 10 | gm./l. |
| (NH$_4$)$_2$SO$_4$ | 3 | gm./l. |
| Sodium chloride | 2 | gm./l. |
| Tap water q.s. | 1 | l. |

The pH is adjusted to about 7.2 – 7.4 with 50% sodium hydroxide, 5 gm. of calcium carbonate is added, and the flasks are sterilized at 120°C. for thirty minutes. The inoculated flasks are incubated at 28°C. on a Gump rotary shaker operating at 250 rpm. Optimum production of 7-0-demethylcelesticetin (IV) is obtained after about 4 days of fermentation. The titer of 7-0-demethylcelesticetin in the fermentation beer is determined by biological assay against the microorganism *S. lutea* by a standard microbiological disc plate assay with 12.5 mm. discs.

Part B: Recovery

Whole fermentation beer (approximately 8.5 liters), obtained by a fermentation process as described above, is filtered using diatomaceous earth as a filter aid. The filter cake is washed with two liters of water and the wash is combined with the clear beer. The clear beer-wash solution is passed over a column prepared from 500 ml. of Amberlite XAD-2 packed in water. The spent beer is collected as one fraction. The column is washed with two liters of water and the aqueous wash is also collected as one fraction. The column is then eluted with 95% aqueous methanol. Three fractions are collected and designated methanol-1 (630 ml.), methanol-2 (600 ml.), and methanol-3 (380 ml.). All fractions, described above, are tested for bioactivity against *Sarcina lutea* by the assay described above to give the following results:

| Fraction | Zone of Inhibition (mm.) /0.1 ml. |
|---|---|
| Clear beer | 28 |
| Spent beer | 0 |
| Aqueous wash | 0 |
| Methanol-1 | 35 |
| Methanol-2 | 27 |
| Methanol-3 | 17 |

Methanolic eluates 1, 2, and 3 are combined and concentrated to give a dry preparation (Prep A).

Further whole fermentation broth (approximately 4 liters) is treated by the same process as described above, to yield a dry preparation (Prep B).

Preparations A and B, described above, are combined; yield, 3.3 gms. (Prep C). This preparation is found to contain 7-0-demethylcelesticetin (IV) as determined by thin-layer chromatography on silica gel G using chloroform-methanol (6:1 v/v) or methyl ethyl ketone-acetone-water (186:52:20) or 2-pentanone-methyl ethyl ketone-methanol-water (2:2:1:1) as the solvent system.

Part C: Isolation of 7-0-Demethylcelesticetin Hydrochloride by Silica Gel G Chromatography The column is prepared from 600 gms. of silica gel G (E. Merck AG Darmstadt 7734) packed in the solvent system consisting of chloroform and methanol in the ratio of 6:1 (v/v). The starting material, Preparation C, prepared as described above, is dissolved in 100 ml. of absolute methanol and 100 ml. of the solvent system chloroform and methanol in the ratio of 6:1 (v/v). The solution is mixed with 50 gms. of silica gel G and the mixture is concentrated to dryness. The slightly colored powder obtained by this treatment is then added on top of the silica gel G column. The column is eluted with chloroform-methanol (6:1 v/v). Fractions of 20 ml. are collected and checked for UV absorption and bioactivity against *S. lutea*. The assays show that 7-0-demethylcelesticetin is concentrated in fractions 98 to 149. These fractions are combined and concentrated to dryness. The resulting residue is dissolved in ether-methanol (500 ml:10 ml., respectively) and the solution is mixed with 5 ml. of 1 N methanolic hydrogen chloride. 7-0-Demethylcelesticetin hydrochloride precipitates out as a colorless amorphous material which is then isolated by filtration and dried; yield, 330 mg. of 7-0-demethylcelesticetin hydrochloride.

EXAMPLE 2

7-0-Demethyldesalicetin (V)

Upon the treatment of 7-0-demethylcelesticetin (IV) with 50% aqueous NaOH for about 16 hours at room temperature, there is produced 7-0-demethyldesalicetin (V). Salicylic acid which is formed as a by-product during the reaction can be removed by extraction with ether at pH 3.0.

EXAMPLE 3

β-Hydroxyethylthiolincosaminide (β-HETL) (VI)

Upon hydrazinolysis of 7-0-demethylcelesticetin (IV) with hydrazine hydrate at reflux for about 23 hours, there is produced β-HETL, hygric acid hydrazide and salicylic acid hydrazide. β-HETL is recovered from the reaction mixture by counter current distribution in the solvent system consisting of equal volumes of 1-butanol and water. This procedure separates β-HETL from hygric acid hydrazide and salicylic acid hydrazide.

What is claimed is:

1. A process for preparing 7-0-demethylcelesticetin having the structural formula:

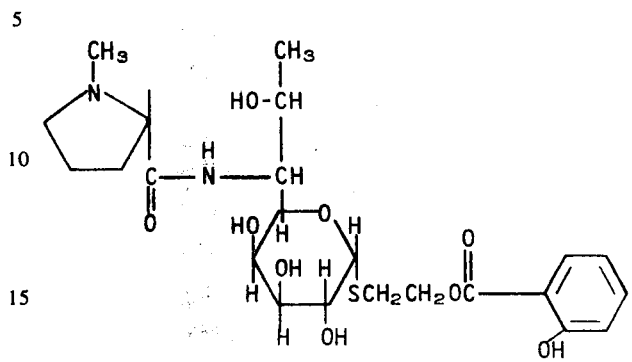

which comprises cultivating *Streptomyces caelestis* strain 22227a, having the cultural characteristics of culture deposit NRRL 5320, in an aqueous nutrient medium under aerobic conditions until substantial antibiotic activity is imparted to said medium by the production of 7-0-demethylcelesticetin.

2. A process according to claim 1 wherein said aqueous nutrient medium contains a source of assimilable carbohydrate and assimilable nitrogen.

3. A process according to claim 1 wherein said produced 7-0-demethylcelesticetin is isolated from the fermentation medium by a process which comprises:
   a. filtering the fermentation whole broth to obtain filtered beer;
   b. passing the filtered beer over a resin comprising a non-ionic macro porous copolymer of styrene crosslinked with divinylbenzene;
   c. eluting said resin with a solvent selected from the group of organic or aqueous organic solvents in which 7-0-demethylcelesticetin is soluble to obtain eluates; and
   d. subjecting said eluates to chromatographic procedures to recover 7-0-demethylcelesticetin.

* * * * *